United States Patent
Kemp et al.

(10) Patent No.: US 7,540,741 B2
(45) Date of Patent: Jun. 2, 2009

(54) TOILET TRAINING AIDES AND KITS

(75) Inventors: Ian David Kemp, Gosforth (GB); Michael Gerard McCabe, Consett Co. (GB); Jon Aleksander Naess, Lancy (CH)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/879,337

(22) Filed: Jun. 29, 2004

(65) Prior Publication Data

US 2005/0239024 A1    Oct. 27, 2005

Related U.S. Application Data

(60) Provisional application No. 60/558,001, filed on Mar. 31, 2004.

(51) Int. Cl.
G09B 19/00 (2006.01)
(52) U.S. Cl. .................................................... 434/247
(58) Field of Classification Search ................ 434/236, 434/237, 238, 247, 258, 262; 4/661
See application file for complete search history.

(56) References Cited

U.S. PATENT DOCUMENTS

| | | | |
|---|---|---|---|
| 3,966,055 A | | 6/1976 | Francavilla |
| 4,776,799 A | * | 10/1988 | Walsh ........................ 434/238 |
| 4,828,498 A | * | 5/1989 | Tilney ........................ 434/127 |
| 4,901,912 A | * | 2/1990 | Pinard ........................ 232/1 C |
| 4,993,680 A | * | 2/1991 | Gemmen et al. ......... 248/444.1 |
| 5,269,691 A | * | 12/1993 | Waldman ..................... 434/429 |
| 5,285,540 A | * | 2/1994 | Putz ................................ 4/661 |
| 5,387,107 A | * | 2/1995 | Gunter et al. ............... 434/238 |
| 5,577,915 A | * | 11/1996 | Feldman ..................... 434/238 |
| 5,579,926 A | * | 12/1996 | Markarian .................... 211/42 |

(Continued)

FOREIGN PATENT DOCUMENTS

JP        08323049 A   * 12/1996

(Continued)

OTHER PUBLICATIONS

Charmin Potty Training Kit with storybook, poster, stickers, and photo magnet, 2001, The Procter & Gamble Company, Cincinnati, Ohio.

(Continued)

*Primary Examiner*—Kurt Fernstrom
(74) *Attorney, Agent, or Firm*—Matthew P. Fitzpatrick; Sarah Dressel; John G. Powell

(57) ABSTRACT

Toilet training aides, toilet training kits and related bathroom training aides and kits are disclosed. Toilet training aides may take the form of a multiple page booklet such a passport like booklet. The pages of the booklet may have a series of iconic images each depicting a toilet activity to a pre-literate or semi-literate child. Associated with each iconic image is a progress indicating area in which success indicating means may be placed for successful completion of the represented activity. Kits can include personal hygiene products ergonomically adapted to be used by a child. The aides and kits disclosed motivate and instruct a toddler or young child on all aspects of toilet training in both a comprehensive and focused manner.

11 Claims, 10 Drawing Sheets

U.S. PATENT DOCUMENTS

| | | | |
|---|---|---|---|
| 5,603,418 A * | 2/1997 | Tellefsen | 211/113 |
| 5,725,382 A * | 3/1998 | Walter et al. | 434/258 |
| 6,038,711 A | 3/2000 | Clarke | |
| 6,129,550 A * | 10/2000 | Culberson et al. | 434/112 |
| 6,203,327 B1 * | 3/2001 | Ottrando | 434/262 |
| 6,219,949 B1 * | 4/2001 | Pang | 40/599 |
| 6,461,164 B1 * | 10/2002 | Ramelli | 434/263 |
| 6,572,380 B1 * | 6/2003 | Buckley et al. | 434/238 |
| 6,612,846 B1 * | 9/2003 | Underhill et al. | 434/365 |
| 2003/0054326 A1 | 3/2003 | Aaron-Barrada | |
| 2003/0152896 A1 * | 8/2003 | Hudson | 434/258 |
| 2006/0172268 A1 * | 8/2006 | Thurman | 434/236 |

FOREIGN PATENT DOCUMENTS

| | | |
|---|---|---|
| WO | WO 02/07129 A1 | 1/2002 |
| WO | WO 2004/080258 A1 | 9/2004 |

OTHER PUBLICATIONS

Kid Access Inc. Instructional Guide, copyright 1998, 99, 2000 KidAccess, Inc. and Potty Training, Washing Hands, and Brushing Teeth (sticker sheets), published 2000.

* cited by examiner

TOILET TRAINING AIDES AND KITS

CROSS REFERENCE TO RELATED APPLICATION

This application claims the benefit of U.S. Provisional Application No. 60/558,001, filed Mar. 31, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to portable interactive aides used to teach and motivate toddlers and young children regarding personal hygiene habits associated with using the toilet and other bathroom activities.

BACKGROUND OF THE INVENTION

The teaching and motivation of toddlers and young children is a subject of much attention in patent and general literature. In particular, numerous writings, devices, techniques, aides and kits have been proposed to assist children, parents (or other caregivers), or both, with the toilet training process. Examples of such offerings include potty training pants which can be disposable pant like garments designed to be pulled up or down by a child. These products have been described in the art as incorporating a wide variety of training enhancing features such as wetness indicating graphics, feel-wet liners, alarms, and similar features.

Additionally, various instructional and motivational aides and devices have also been described in the art. Examples of such devices are toilets which have lights or sound devices. Other motivational or instructional aides include scenes upon which reward stickers can be placed such as those described in U.S. Patent Application 2003/0054326. Self contained kits housing a variety of toilet training related products have also been proposed such as the kit described in U.S. Pat. No. 5,725,382. This kit combines training pants in combination with an activity device in a container having partitions.

While the kits, devices, and aides described in the prior art do serve motivational and training purposes, they are incomplete in several important respects. For the most part, kits such as those described in U.S. Pat. No. 5,725,382 have focused solely on the toilet using aspect of potty training. Thus, the patent describes training pants, and interactive aides intended to encourage, motivate and reward behaviors such as pulling off clothing, urination, defecation, and pulling clothing back on. Similarly, the aides of U.S. Patent Application 2003/0054326 are general, including kit friendly scenes such as clouds and sky. Parents are instructed to allow children predetermined numbers of stickers as rewards for such behavior as sitting on the potty, urination, and defecation. One embodiment suggests one, two, and three stickers for each of these activities. What is missing from these prior art attempts at improving the training process is a comprehensive aide which instructs, motivates, and rewards children in all aspects of successfully using the potty. Such aspects include more than the excretion function itself, and should also include related hygiene tasks such as wiping, and hand washing.

Entering the bathroom and successfully completing all of the hygiene related tasks associated with using the toilet can be a challenging and complicated process for a young child. Children of the toilet training age typically have short attention spans, and may have difficulty remembering the details and sequence of new and complex tasks. A need exists to help young children learn and be positively motivated and reinforced on information directed to a plurality of hygiene tasks associated with toilet training.

SUMMARY OF THE INVENTION

In one embodiment the present invention may be directed to a toilet training aide. The aide may comprise a first iconic imaging depicting a first toilet activity and a first progress indicating area associated with said first iconic image. The aide may also comprise a second iconic image depicting a second a second toilet activity and a second progress indicating area associated with said second iconic image. The aide may also comprise a first success indicating means wherein said first success indicating means may be placed within said first progress indicating area, and a second success indicating means wherein said second success indicating means may be placed within said second progress indicating area.

The toilet training aide may be provided in the form of a multiple page booklet. The first iconic image in the aide may depict using the commode. The second iconic image may depict wiping. A third iconic image may be provided which depicts hand washing. The toilet training aide may have at least three iconic images wherein said first iconic image depicts using the commode, said second iconic image depicts wiping, and said third iconic image depicts hand washing.

The toilet training aide may be associated with one or more personal hygiene products wherein said one or more personal hygiene products is ergonomically adapted for use by a child. The one or more personal hygiene products may include a child toilet wipe. Such products may include liquid hand soap.

The success indicated means of the toilet training aide comprise an item selected from the group consisting of: stickers, stamps, appearing graphics, crayons, magic markers, pencils, and combinations thereof.

The toilet training aide may further comprise a door hanger wherein said door hanger is packaged in a common package with said aide. The toilet training may be in the form of a multi-dimensional geometric shape.

An embodiment of the invention may be toilet training kit comprising at least one personal hygiene product wherein said personal hygiene product is ergonomically adapted for use by a child. Such kit may further comprise a toilet training aide wherein said toilet training aide comprises a first iconic image and a second iconic image wherein said first iconic image depicts a first toilet activity and wherein said second iconic image depicts a second toilet activity, and wherein said first toilet activity is different from said first toilet activity.

The personal hygiene product of such a kit may comprise toilet wipes or liquid hand soap.

An embodiment of the present invention may be a bathroom training aide comprising a first iconic image depicting a first bathroom activity, a first progress indicating area associated with said first iconic image, a second iconic image depicting a second a second bathroom activity, a second progress indicating area associated with said second iconic image, a first success indicating means wherein said first success indicating means may be placed within said first progress indicating area, and a second success indicating means wherein said second success indicating means may be placed within said second progress indicating area.

The first and second bathroom activities of such a kit may be activities are related to bathing or brushing teeth.

An embodiment of the present invention may comprise a personal hygiene product, said personal hygiene product being ergonomically adapted for use by a child and an interactive bathroom training aide, said bathroom training aide comprising at least a first and a second iconic image depicting at least a first and a second bathroom activity, said interactive bathroom training aide being associated with said personal hygiene product.

BRIEF DESCRIPTION OF THE DRAWINGS

While the specification concludes with claims particularly pointing out and distinctly claiming the subject matter which is regarded as forming the present invention, it is believed that the invention will be better understood from the following and forgoing description taken in conjunction with the accompanying drawings, in which:

DETAILED DESCRIPTION OF THE INVENTION

Figure 1:
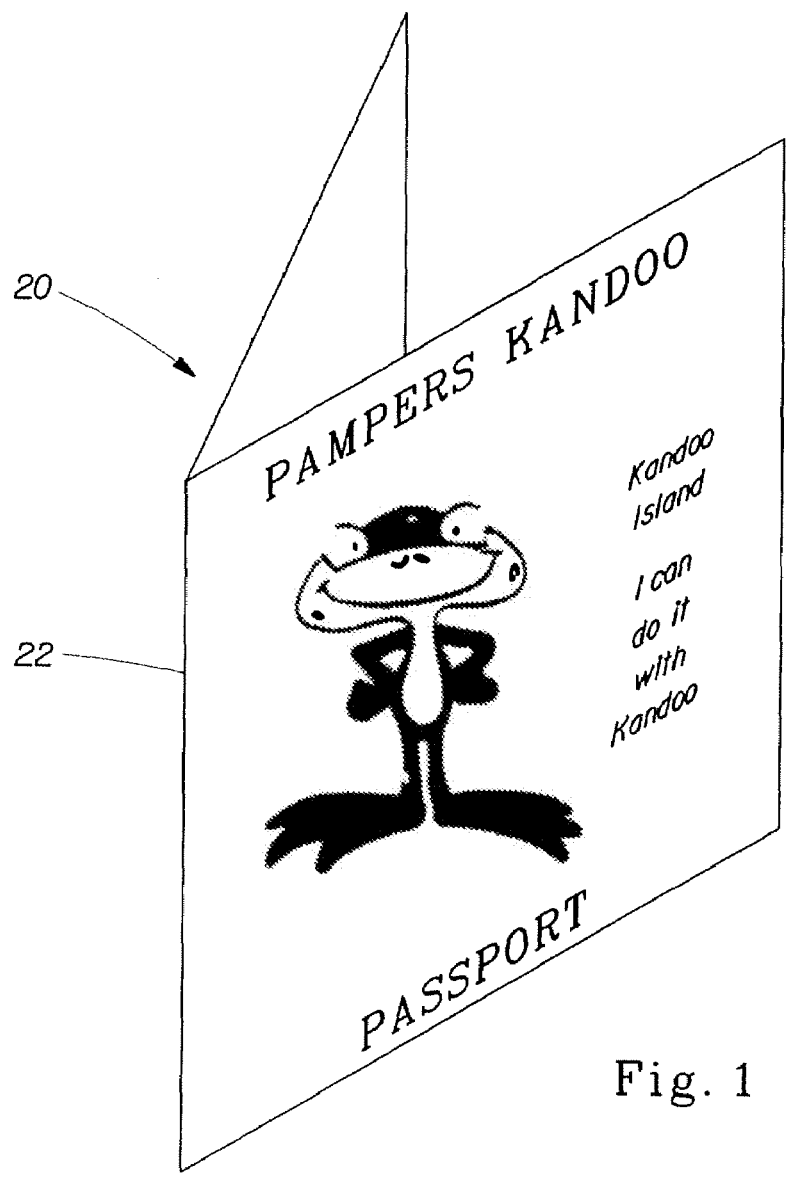
FIG. 1 shows an aide of the present invention in the form of a booklet.

The present invention is directed to portable interactive used to teach and motivate toddlers and young children regarding personal hygiene habits associated with using the toilet and other bathroom activities. Typically, the toilet training of toddlers and young children involves significant interaction between the child and a caregiver. The term "caregiver" as used in this specification refers to parents, babysitters, family members, teachers, day care workers, or the like. For purposes of style and simplicity, the term "parent" will be used in this specification to refer generically to any caregiver and the use of this term is in no way intended to limit the scope of the aides described and claimed. As used herein the term "toilet training" or "toilet training process" will be used in a broad sense to include the teaching, reinforcing, and motivation of children with respect to all activities associated with or related to excretion itself. These components include, but are not necessarily limited to: entering the lavatory or bathroom, removing clothing, sitting on the commode, voiding, flushing, wiping or other clean up, replacing clothing, hand washing, and leaving the lavatory or bathroom. Collectively, these components may also be referred to as "toilet activities" in the present specification as the context requires.

The term "bathroom activities" is defined herein to refer to personal hygiene activities which typically take place in a bathroom or lavatory which are not necessarily "toilet activities" as that term is defined herein. Examples of "bathroom activities" include bathing (with sub-activities of body washing, hair washing, drying, dressing, etc.) and brushing teeth (with sub-activities of wetting brush, putting on toothpaste, brushing, rinsing and clean-up of equipment). The aides of the present invention will be described in the particular context of the toilet training process, however, it will be readily appreciated that aides of the present invention can also be provided for other bathroom activities.

It is been known that parents desire the toilet training process to be as easy and as quick as possible. To this end, the art has described a wide variety of techniques, aides, and devices as indicated above to accomplish the toilet training task. For the most part, these attempts have suffered from one or both of two fundamental problems. The first is that the motivational aides are too generic. Examples of such aides are those that might be interesting to the child generally, but do not reinforce, teach, or motivate with respect to toilet activities in particular. For example, candies, "sky and cloud" scenes, and trinkets such as rings or cars might fall into this category. The second often encountered problem is aides which are too focused on only the voiding (and sometimes dressing and undressing) aspect of toilet training while ignoring the related hygiene tasks such as wiping and hand washing. Superior toilet results are achieved through aides according to the present invention which are both toilet activity focused and comprehensive—thus overcoming the two principal drawbacks of items in the art.

Figure 2:
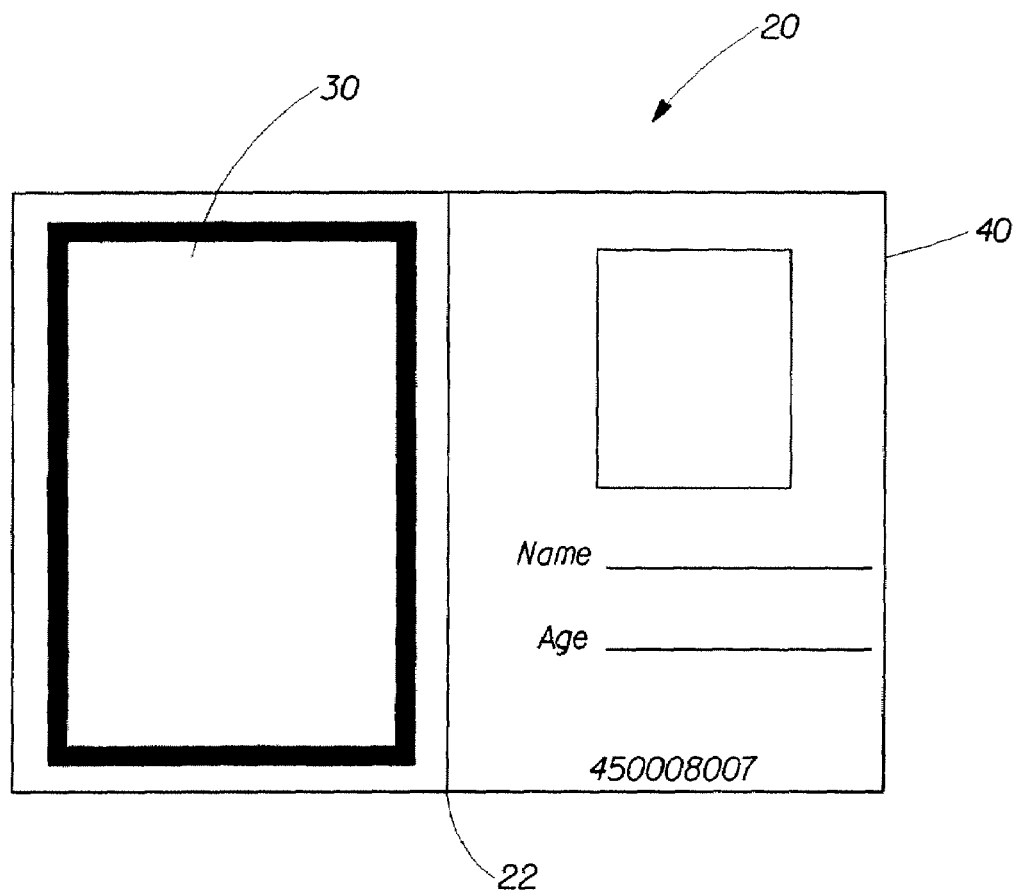
FIG. 2 shows a first and second interior page of the booklet of FIG. 1.

FIG. 1 shows an example of a toilet training aide according to the present invention. The toilet training aide is in the form of a booklet 20. In the embodiment shown, the booklet 20 is designed to resemble a passport and may comprise multiple pages as is the case with a conventional passport. The booklet 20 is shown in a partly closed configuration around its spine 22. FIG. 2 shows a view of booklet 20 opened to a first page and laid in a flat opened configuration (i.e. with spine 22 now in the middle of opposite facing pages 30 and 40). FIG. 2 represents an optional series of pages. First page 30 can include a place for a child to draw, place a picture, sticker, or otherwise personalize the booklet 20. Optional second page 40 may include a location for a child or parent to write the child's name and age (or any other suitable personalizing information) in the booklet 20. Mock "serial number" information may also be included to enhance the "passport-like" appearance of this particular execution. Other passport like features may desirably be provided throughout the booklet to increase its resemblance of a conventional passport.

Figure 3:
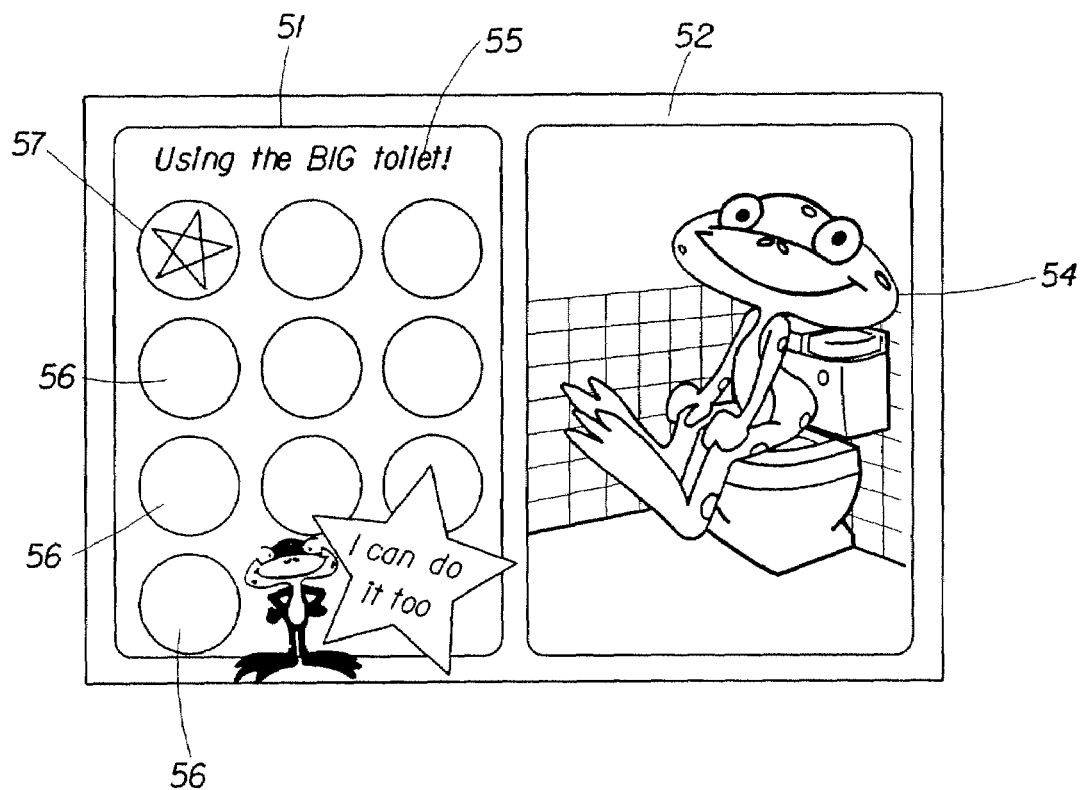
FIGS. 3-7 show a series of interior pages of the booklet of FIG. 2 showing a series of iconic images and associated reward or progress indicating areas.
Figure 4:
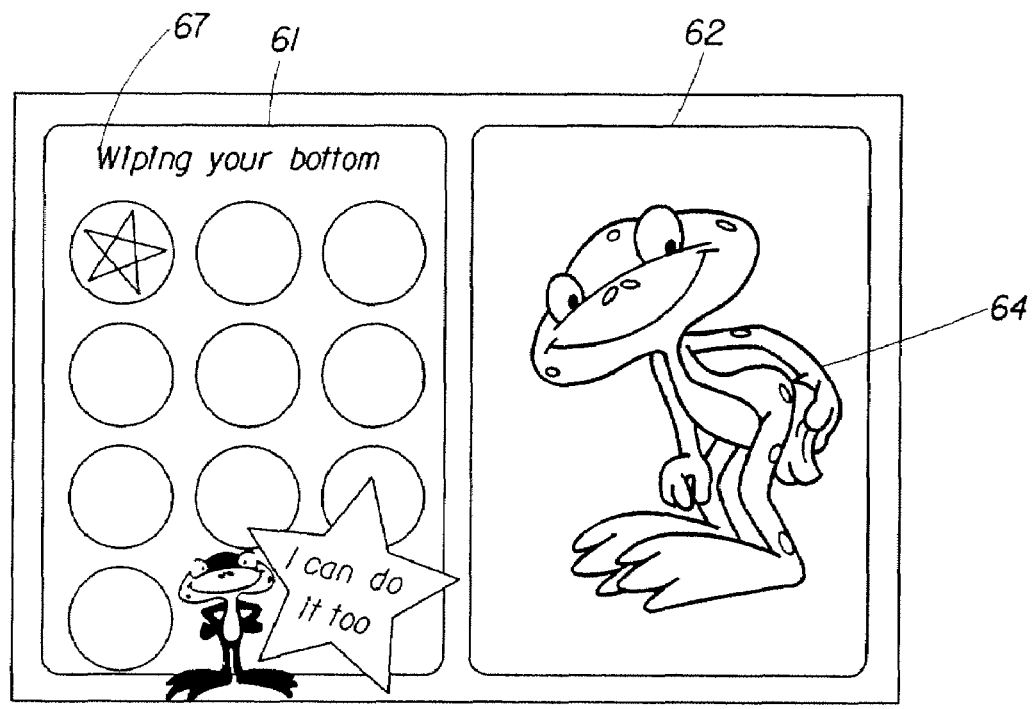
Figure 5:
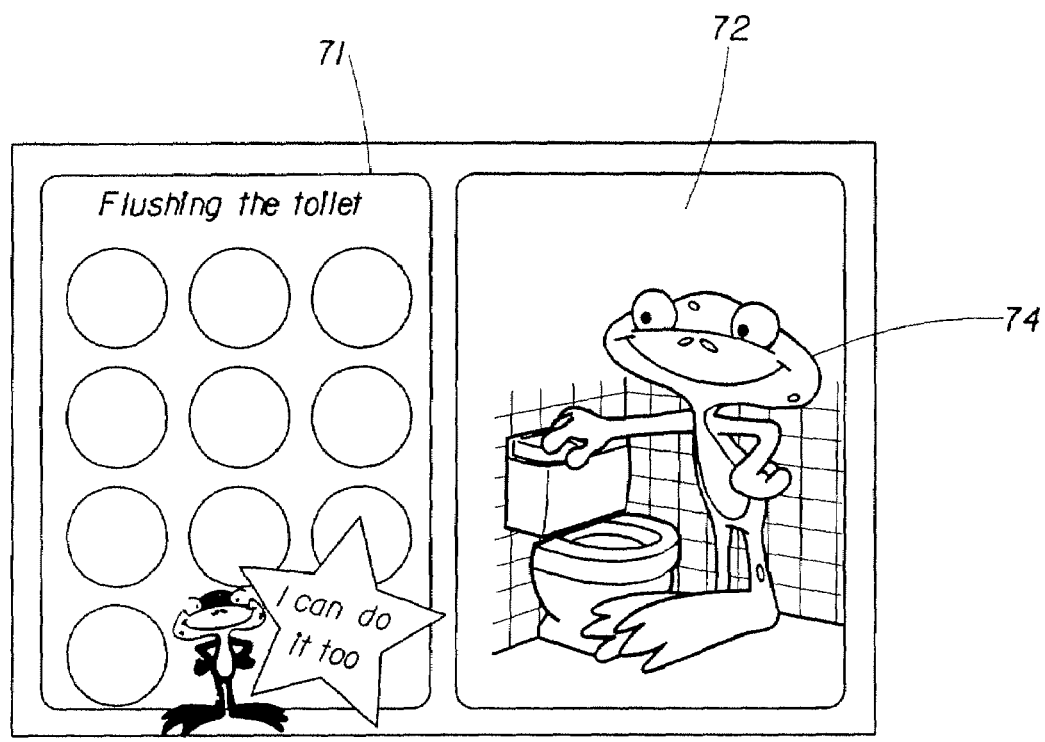
Figure 6:
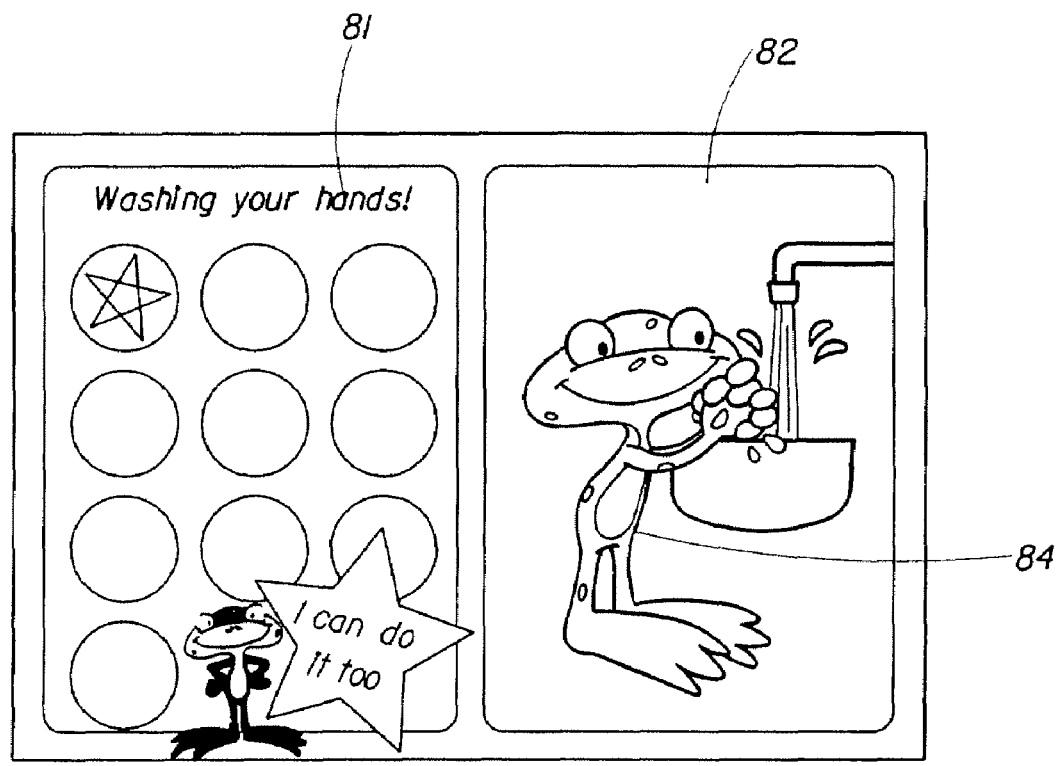
Figure 7:
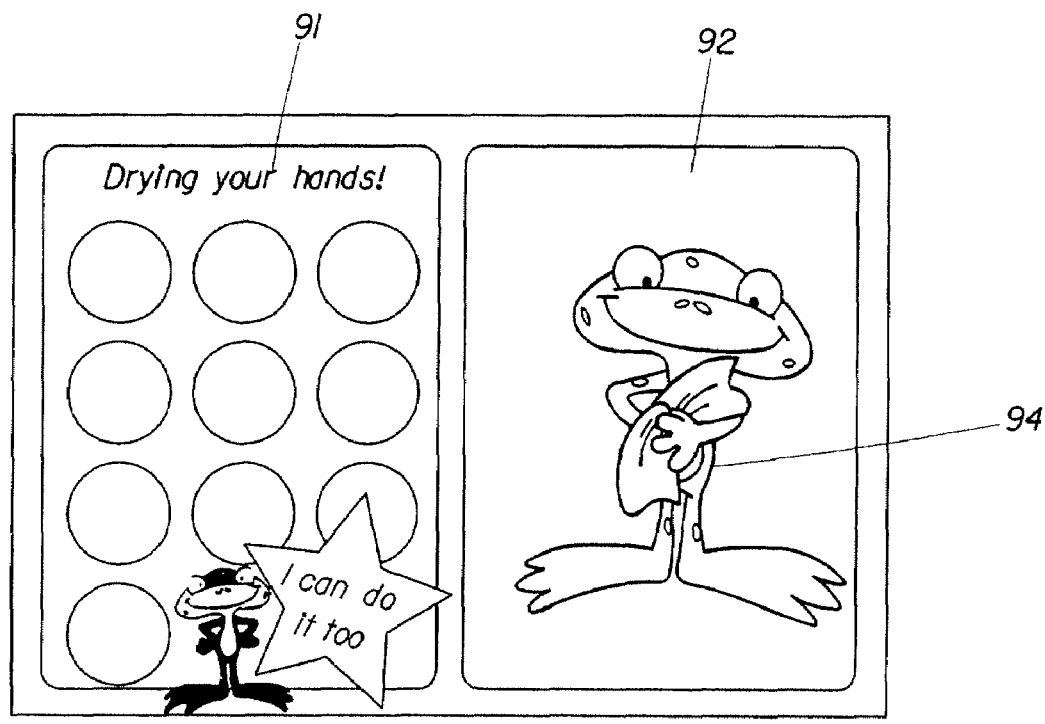

FIGS. 3-7 show examples of pages which may comprise the interior pages of booklet 20. While no particular page, order, or content of any given page is critical—certain features in combination are desired. Firstly, collectively the interior pages (such as interior pages 51, 52, 61, 62, 71, 72, 81, 82, 91, and 92) should comprise a plurality of pages. It is desired that the booklet 20 as a whole comprise two or more iconic images which provide instructions for a pre-literate or semi-literate child pertaining to at least two toilet activities. As used herein, the term "iconic images" means one or more graphics, pictures, drawings, block diagrams, or other suitable images which convey information regarding how to perform a particular task without the use of written language instruction. Examples of such iconic images are shown in FIG. 3-7 as iconic images 54, 64, 74, 84, and 94. For example, iconic image 54 (FIG. 3) shows a character graphic sitting on the commode. This conveys the nature and basic instructions for this task to the child using booklet 20. Similarly, FIG. 4 shows iconic image 64 which shows the same character graphic using a wipe to wipe after using the commode. This iconic image 64, therefore, represents a second toilet activity different from the first. FIG. 5 shows iconic image 74 depicting the character graphic flushing the toilet. FIG. 6 shows iconic image 84 which depicts the character graphic washing his hands. FIG. 7 shows iconic image 94 which depicts the character graphic drying his hands.

It will be appreciated that each of these exemplary images conveys instructions and information pertaining to a different toilet activity. It will also be readily appreciated that the exact nature of the image can be varied substantially while still achieving the useful results described herein. For example, the various toilet activities shown, can be further sub-divided into other tasks. A more complicated task such as hand washing could be shown with a series of images, rather than a single image. Arrows, or other supplemental indicia could be used to further clarify the teaching content of the images. All manner and variety of icons can be used in the iconic images of the invention. Persons or characters may be depicted. Block figures such as the "Olympic" style figures could be used.

FIGS. 3-7 show icons of a child-friendly character which has human like features. Characters known to children (e.g. licensed entertainment characters) can be used, or new characters can be created for this purpose. It is desirable, but not necessary to use a consistent icon theme throughout each page of the booklet. Therefore, FIGS. 3-7 show a series of icons in which the character graphic is a frog-like character drawn in a similar style and performing a series of toilet activities.

The arrangement demonstrated by FIGS. 3-7 allows a child to flip through the pages of booklet 20 from one toilet activity to another. At each page, the child receives information regarding the toilet activity. The picture reminds the child of the task, preferably also in a logical sequence, and gives the child something fun to do as he or she progress through the often complex (for a young child) sequence of tasks which comprise the toilet using process.

It is preferable that the iconic images will be understood by a pre-literate or semi-literate child. As used herein, the term "pre-literate" means a child who has not yet learned to read. A "semi-literate" child is a child that possesses some reading skills, but has not yet obtained proficiency at reading and comprehending written words. As shown in FIG. 3, for example, the interior pages of the booklet 20 may comprise both written descriptions of a task such as written description 55 on interior page 51, and an iconic image, such as iconic image 54 corresponding to the written description 55 of a particular toilet activity.

As demonstrated in FIGS. 3-7 it is also preferable that the iconic images remind the child of each depicted toilet activity and convey some basic information about how to perform that activity. A complete series of toilet activities such as those shown in FIGS. 3-7 may be shown, or only certain toilet activities may be shown. The total number of activities depicted is preferably between two and about eight.

FIGS. 3-7 depict a plurality of interior pages 52, 62, 72, 82, and 92 each of which is provided with an iconic image corresponding to one of a plurality of toilet activities. FIGS. 3-7 show each of these pages being located on the right side of a two-page sequence within the booklet 20. Each of the opposite interior pages 51, 61, 71, 81, and 91 is shown as provided with an award or progress recording area such as progress circles 56. It is desirable, but not necessary to locate each of a plurality of award or progress recording areas in proximity (such as on an opposite facing page) of the corresponding iconic image. The aide of the present invention is optionally provided with the means for the parent to allow the child to mark or otherwise note successful completion of each of the depicted toilet activities. For example, the booklet 20 may be provided with one or more pages of stickers, stamps, stars, or other removable and affixable indicia. Such indicia may also be located remote from the booklet 20, but otherwise included as part of the aide. Markers, crayons, stamps, or pencils, or other writing implements could also be used to make an indication in the award or progress recording area. Other means for indicating success could be integral with the aide itself, such as an appearing mark activated by scratching, wetting, an "invisible ink" pen, or the like. The means for indicating success could be an image located behind a removable cover, or tab integral with the page of the booklet 20. A wide variety of equivalent means for indicating success can readily be envisioned by those of skill in the art consistent with the principles of the invention. The particular format of the reward or progress mark is not critical. It is, however, desired that the booklet 20 be provide with a plurality of such progress marking areas and that at least two of these correspond to at least two of the toilet activities which are represented by the iconic images. In this manner, the child can be separately rewarded and motivated to complete each toilet task. The child will be motivated to keep progressing to the next task and will more reliably complete all of the tasks associated with using the toilet.

FIG. 3 shows an example of success indicating means in the form of sticker 57 placed on one of the provided progress circles 56 associated with the toilet activity of using the toilet. Similarly, FIG. 4 shows sticker 67 which is a success indicating means placed on the progress indicating area of associated with the iconic image for the wiping toilet activity shown. The stickers shown in FIGS. 3-4 depict stars, but any design, graphic, or logo could be employed.

The arrangement of a toilet training aide according to the present invention is contrasted to presently available reward devices for further clarification. If a simple chart of "successful potty uses" and stickers is provided, the parent faces a dilemma if the child voids on the toilet, but forgets or does not want to wash his or her hands. The parent can treat the episode as a "successful" potty use and provide the reward sticker, but risk re-enforcing the "optional" nature of hand-washing. Alternatively, the parent can consider the potty usage an "all or nothing" scenario, and risk frustrating the child struggling to learn all of the associated tasks and trying to maintain focus and interest throughout them all. The aides of the present invention, by contrast treat each toilet activity as one in a series allowing for intermediate rewards which motivates the child to persevere and move to the next task to earn the next reward.

As shown in FIGS. 3-7 the overall aide (such as that shown in the form of booklet 20), may take on a consistent theme. FIGS. 3-7 represent the theme of a "passport." This theme is optional, and it will readily be appreciated that wide variety of themes could be employed. It may be desired to provide optional design elements consistent with the theme, however. For example, in the passport theme the size of the booklet 20 could be similar to that of a conventional passport. The reward or progress areas could resemble the visa stamp locations of a typical passport. The inclusion of the child's name and photograph would also be part of the theme. The aide, such as booklet 20, can be provided with optional design elements to enhance its appeal to children. For example, the iconic images could be line drawing which may be personalized by the child, such as by coloring. Alternatively the iconic images may already be colored. The booklet 20 may be partially or totally waterproof which increases its durability and likelihood of surviving accidental splashing or immersion in water in the bathroom setting. Ideally, the booklet is sized and designed to be held easily by a child. Additionally, it is desirable that the booklet be compact enough to be portable and easily carried by a child or parent for use away from home if desired.

Having described the basic features of an aide of the present invention (presented in the form of a booklet), optional features will now be described in further detail. These features may be employed separately, together, or in any combination to enhance the effectiveness and impact of the aides of the invention. For example, the aides of the present invention may also include more detailed instructions to parents on use of the aide and tips for training. Such instructions may be separate from the aide itself or integrally incorporated into it—such as through text on the pages of a booklet.

The aides of the present invention need not take on the form of a booklet. Any convenient format which allows for the association of a plurality of toilet activities and a plurality of reward or progress indicating areas is acceptable. For example, an aide of the present invention can take the form of a multiple dimensional object such a cube. Each face of the cube could be provided with one of a series of iconic images such as those described above and also provided with an associated reward or progress indicating area. These areas would serve as locations to place one or more success indicating means as described above. Other multi-dimensional shapes are possible as well. Even a format which changes shape during use may be employed. It is also possible for the aide to comprise a series of discrete pages, posters, wall charts, adding pieces to a puzzle, which are not necessarily physically bound or associated together. Such an arrangement has the advantage that pages all placed on the wall, for example would allow the child to visualize all of the toilet activity steps simultaneously. However, this arrangement could suffer from the drawback of losing some portability and ease of use.

The pages (or other format of iconic image and associated reward or success indicating areas) can be color coordinated. For example, a given color can be used to correspond to a given toilet activity. If a success indicating means is employed which is separate from the basic surface of the aide (such as a series of stickers) these may be color coordinated to the color scheme employed in the pages. Gender-specific success indicating means may also be employed. For that matter, the entire aide can be enhanced with gender-specific design elements if desired. The aide may be provided with a larger prize which the child can "build to" by successfully filling the progress indicating areas of one or more locations on the aide. Another variation on this theme is the aide may be provided with a redeemable certificate for such a prize.

As described above, a useful feature of the aides of the present invention is that a plurality of toilet activities are taught and motivated through the use of iconic images. While the particular choice of toilet activities is not critical, it is desirable to include at least using the toilet, wiping, and hand washing among the toilet activities represented and rewarded with the success indicating means. These tasks are the major basic tasks of using the toilet and parents often have difficulties and challenges in ensuring that the child not only voids on the toilet, but also learns good hygiene habits by practicing proper wiping and hand washing.

Aides of the present invention may be even further enhanced in their effectiveness by relating to products specifically designed to assist toddlers and young children in completing toilet activities. For example, wiping is a toilet activity which is preferably to include as one of the toilet activities taught and motivated by the aide. Toddlers and young children, however, may have difficulty using conventional toilet paper to complete this task. Reasons for this often include the difficulty of tearing off a desired number of sheets from a continuous roll, the dry nature of toilet paper (making it difficult for a child with limited dexterity to clean thoroughly), and the difficulty of manipulating the paper to "wad" it into a suitable shape. A child friendly toilet wipe (such as a pre-moistened, flushable) packaged in a child friendly container (such as a pop-up lid tub with an easy to use "push button" feature designed for little fingers or hands) may be associated with the aide. An example of such a child-friendly toilet wipe is the line up of wipes sold by the Procter & Gamble Company of Cincinnati, Ohio, under the trademark Pampers Kandoo toilet wipes. These wipes are sold in tubs which can be easily activated by small hands and which can be mounted on a bathroom wall (using a holder) at any convenient to reach location for a child.

The association of such a product to the aide of the present invention can take many forms. The aide could specifically suggest a particular product to use for the represented toilet activity. Other associations could include the physical packaging of such products with the aide to form a toilet training kit. Other associations could include common icon schemes (such as using the frog character shown in FIGS. 3-7 on the aide and on the child-wipe product). Such common indicia could be combined with common shelving and point of sale shelf enhancements to bolster the link between the aide and the products during shopping.

Another child-friendly product which may be associated with aides of the present invention is hand-soap in a child friendly dispenser. Children often have difficulty is using bar soap due its size in comparison to their hands. Liquid or semi-liquid hand soap in an ergonomically friendly container may be associated with the aides in the manner described above for toilet wipes. One or both (and even additional products) may be so associated. Ergonomically friendly elements in the case of hand soap may include a wide base, a large push area for dispensing, resistance of the dispenser to tipping or falling, and bright colors.

Figure 8:
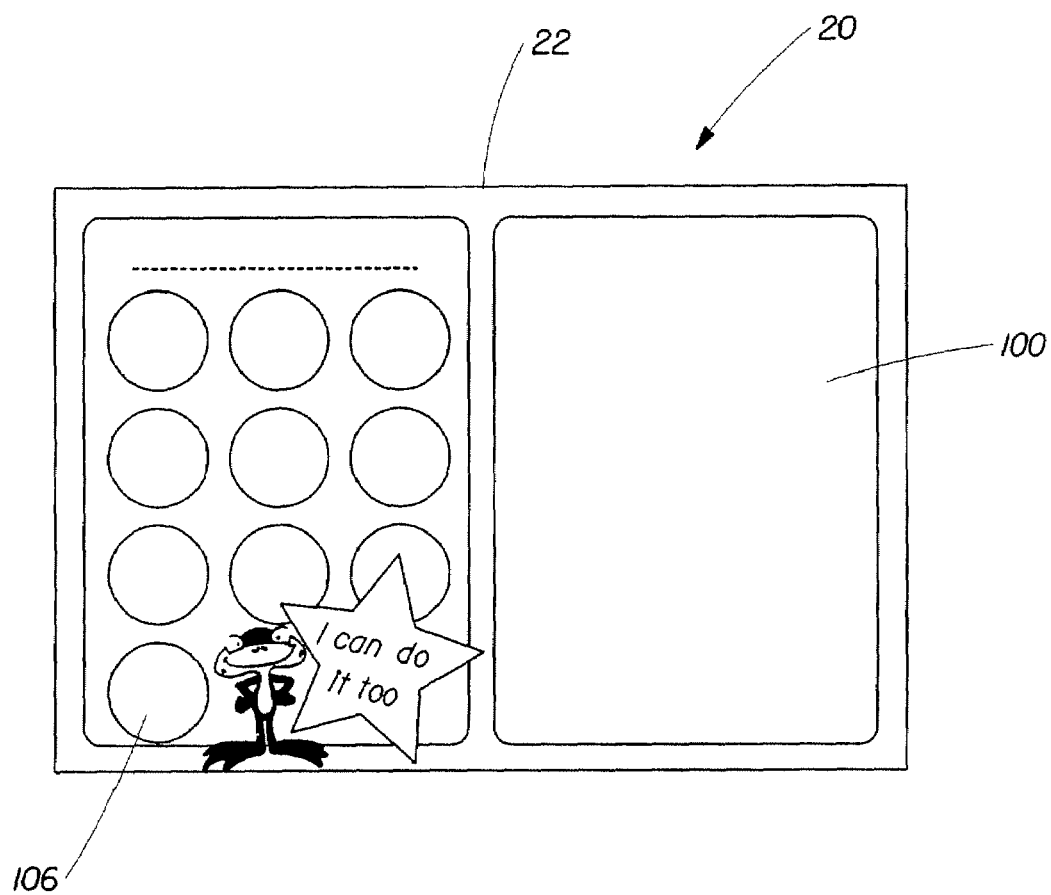
FIG. 8 shows interior pages of the booklet of FIG. 1 which may be customized or personalized by the user.

FIG. 8 shows an example of an optionally included blank page in booklet 20. It may be desired to include one or more of such black pages (either completely blank or with progress indicating areas 106) to allow for further personalization or customization of the aide by the child and parent.

Figure 9:
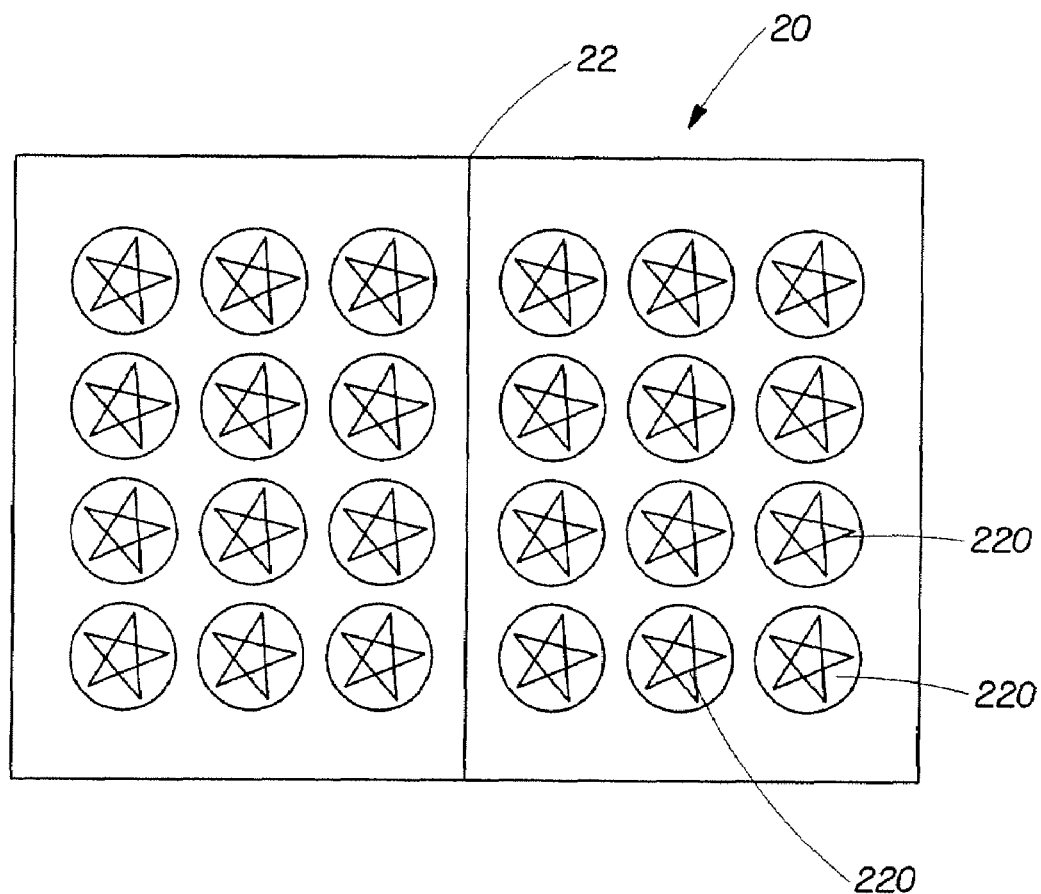
FIG. 9 shows interior pages of the booklet of FIG. 1 which include a plurality of success indicating means.

FIG. 9 shows an example of pages which may be included in booklet 20 containing a plurality of success indicating means such as stickers 220. These stickers may be placed on a page or series of pages in the booklet 20 and affixed to an appropriate success indicating area of the booklet 20 upon completion of the associated potty activity. As noted previously, the success indicating means can take on a wide variety of forms, and need not be provided in a manner integral with the rest of the aide.

Figure 10:
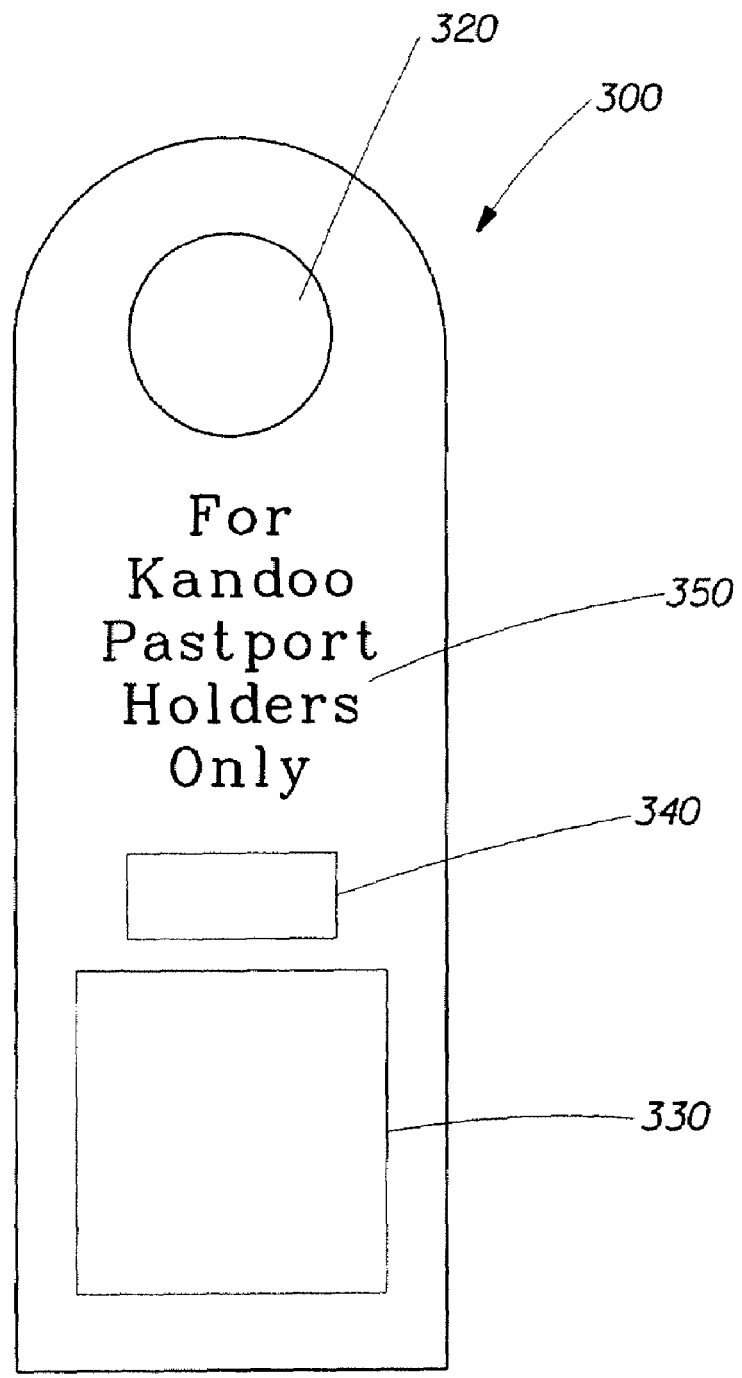
FIG. 10 shows a door hanger which may be provided as part of an aide of the present invention.

FIG. 10 shows an example of an optional door hanger 300. The door hanger could include a hole such as hole 320 or other suitable means (such as a hook, slot, etc) for attaching the hanger to a bathroom door. The door hanger 300 may be employed in conjunction with the aide to assist in the creation of interest and excitement for the child. It may also assist in giving the child a sense of personal ownership of the space (e.g. the bathroom) which otherwise might seem scary or frightening to the child. The door holder 300 could be provided with a holding mechanism such as pouch 330. Pouch 330 could be sized so as to be a receptacle for booklet 20 (if this form of aide is employed) for when the booklet 20 is not in use. In this manner, the parent and child will always know where the booklet is, and will remember to use it during each visit to the bathroom. Coordinating icons (generically depicted as 340) can be provided, as can motivational or inspirational messages 350. Text such as that shown in FIG. 10 can be used, or pictures and icons can be employed, or both can be used in combination to make the door hanger 300 fun, motivational, and inspirational to the child and parent.

While aides of the present invention have been described in the context of a toilet training aide and toilet activities, aides according to the present invention can also be provided for other bathroom activities. For example, a booklet (or other suitable format) aide could be provided which is directed to the bathing process. The plurality of iconic images could show such activities as hair washing, body washing, drying, and dressing. Associated success or progress indicating areas are provided as described above. Association with child-friendly products such as a child bath washmit (an example of which is described in U.S. Patent Application Ser. No. 60/453,167) or child shampoo dispensers could also be provided in a manner similar to that described above in the toilet training aide context.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A toilet training aide provided in the form of a multiple page booklet configured to teach a child individual toilet activities from a series of toilet training activities, said toilet training aide comprising:
    a first page, said first page comprising an iconic image disposed thereon, said first iconic image depicting a first toilet activity;
    a first progress indicating area disposed on said first page or opposite said first page such that both of said first iconic image and said first progress indicating area may be viewed simultaneously without the need to turn pages in said booklet;
    a second page, said second page comprising an iconic image disposed thereon, said second iconic image depicting a second toilet activity;
    a second progress indicating area disposed on said second page or opposite said second page such that both of said second iconic image and said second progress indicating area may be viewed simultaneously without the need to turn pages in said booklet;
    a first success indicating means wherein said first success indicating means may be placed within said first progress indicating area to denote the successful completion of the first toilet activity and wherein said first success indicating means, said first progress indicating area, and said first iconic image are color coordinated to communicate to a pre-literate user that a cooperative relationship exists between said first success indicating means, said first progress indicating area, and said first iconic image;
    a second success indicating means wherein said second success indicating means may be placed within said second progress indicating area to denote the successful completion of the second toilet activity and wherein said second success indicating means, said second progress indicating area, and said second iconic image are color coordinated to communicate to a pre-literate user that a cooperative relationship exists between said second success indicating means, said second progress indicating area, and said second iconic image.

2. The toilet training aide of claim 1 wherein said first iconic image depicts using a commode.

3. The toilet training aide of claim 1 wherein said second iconic image depicts wiping.

4. The toilet training aide of claim 1 further comprising a third iconic image depicting hand washing.

5. The toilet training aide of claim 1 further comprising a third iconic image wherein said first iconic image depicts using a commode, said second iconic image depicts wiping, and said third iconic image depicts hand washing.

6. The toilet training aide of claim 1 wherein said aide is associated with one or more personal hygiene products wherein said one or more personal hygiene products is ergonomically adapted for use by a child, wherein said association between aide and said one or more personal hygiene products is accomplished through the use of common indicia disposed on each of said aide and said one or more personal hygiene products.

7. The toilet training aide of claim 6 wherein said one or more personal hygiene products includes a child toilet wipe.

8. The toilet training aide of claim 6 wherein said one or more personal hygiene products includes liquid hand soap.

9. The toilet training aide of claim 1 wherein said success indicating means comprises an item selected from the group consisting of: stickers, stamps, appearing graphics, crayons, magic markers, pencils, and combinations thereof.

10. The toilet training aide of claim 1 further comprising a door hanger wherein said door hanger is packaged in a common package with said aide.

11. The toilet training aide of claim 1, further comprising a third page comprising a blank page, said third page adapted to enable a user of the training aide to customize the training aide to a desired toilet activity; and a third progress indicating area disposed on said third page or opposite said third page such that both of said blank page and said third progress indicating area may be viewed simultaneously without the need to turn pages in said booklet.

* * * * *